(12) United States Patent
Chien et al.

(10) Patent No.: US 9,891,515 B2
(45) Date of Patent: Feb. 13, 2018

(54) PROJECTION SCREEN

(71) Applicant: Coretronic Corporation, Hsin-Chu (TW)

(72) Inventors: Hung-Ta Chien, Hsin-Chu (TW); Fang-Hsuan Su, Hsin-Chu (TW); Fu-Chiang Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/431,780

(22) Filed: Feb. 14, 2017

(65) Prior Publication Data

US 2017/0242329 A1 Aug. 24, 2017

(30) Foreign Application Priority Data

Feb. 19, 2016 (CN) .......................... 2016 1 0093515

(51) Int. Cl.
*G03B 21/60* (2014.01)
*G02B 5/18* (2006.01)
*G02B 5/02* (2006.01)
*G02B 3/08* (2006.01)

(52) U.S. Cl.
CPC .......... *G03B 21/60* (2013.01); *G02B 5/0284* (2013.01); *G02B 5/1885* (2013.01); *G02B 3/08* (2013.01)

(58) Field of Classification Search
CPC ..... G03B 21/56; G03B 21/602; G03B 21/604
USPC ......................................................... 359/459
See application file for complete search history.

(56) References Cited

U.S. PATENT DOCUMENTS

| 4,911,529 | A | 3/1990 | Van De Ven |
| 6,636,355 | B2 * | 10/2003 | Moshrefzadeh ..... G03B 21/625 359/453 |
| 6,822,792 | B2 * | 11/2004 | Goto .................... G03B 21/625 359/456 |
| 6,842,282 | B2 | 1/2005 | Kuroda et al. |
| 7,110,176 | B2 | 9/2006 | Maruta et al. |

(Continued)

FOREIGN PATENT DOCUMENTS

| CN | 101297241 | 10/2008 |
| CN | 102243430 | 11/2011 |

(Continued)

*Primary Examiner* — Clayton E Laballe
*Assistant Examiner* — Linda B Smith
(74) *Attorney, Agent, or Firm* — JCIPRNET

(57) ABSTRACT

A projection screen including a substrate, Fresnel structures and a protective layer is provided. The Fresnel structures are located on a surface of the substrate facing an image-source side and arranged along a first direction. Each Fresnel structure extends along a second direction. The protective layer has a first surface facing the image-source side. The first surface has optical microstructures. The optical microstructures are orthographically projected on a reference plane to form orthographic projection patterns. Each of the orthographic projection patterns has a first axis and a second axis substantially perpendicular to each other. The first axis passes through two end points having a maximum distance in the first direction. The second axis passes through two end points having a maximum distance in the second direction. Each of the orthographic projection patterns is symmetry to at least one of the first axis and the second axis.

19 Claims, 12 Drawing Sheets

(56) References Cited

U.S. PATENT DOCUMENTS

| | | | |
|---|---|---|---|
| 7,139,123 B2* | 11/2006 | Chubachi | G02B 3/08 359/449 |
| 7,262,911 B2 | 8/2007 | Niwa et al. | |
| 7,262,912 B2* | 8/2007 | Wood | G03B 21/602 359/443 |
| 7,538,942 B2* | 5/2009 | Odagiri | G02B 3/0031 359/455 |
| 8,218,236 B2 | 7/2012 | Shiau et al. | |
| 8,780,444 B2 | 7/2014 | Arakawa et al. | |
| 2002/0044360 A1* | 4/2002 | Yoshida | G03B 21/625 359/619 |
| 2004/0095656 A1* | 5/2004 | Lee | G02B 5/1814 359/742 |
| 2005/0068617 A1* | 3/2005 | Mizuno | G03B 21/56 359/443 |
| 2011/0122649 A1* | 5/2011 | Wen | G02B 6/0036 362/606 |
| 2013/0293851 A1* | 11/2013 | Tsai | G02B 27/126 353/38 |
| 2014/0036359 A1* | 2/2014 | Jeon | G03B 21/60 359/459 |
| 2014/0092471 A1 | 4/2014 | Sadahiro et al. | |
| 2015/0062712 A1* | 3/2015 | Tazawa | G02B 1/118 359/599 |

FOREIGN PATENT DOCUMENTS

| | | |
|---|---|---|
| CN | 203587956 | 5/2014 |
| CN | 103946746 | 7/2014 |
| TW | 388802 | 5/2000 |
| TW | 200304579 | 10/2003 |
| TW | I494681 | 8/2015 |
| TW | 201600917 | 1/2016 |

* cited by examiner

PROJECTION SCREEN

CROSS-REFERENCE TO RELATED APPLICATION

This application claims the priority benefit of China application serial no. 201610093515.X, filed on Feb. 19, 2016. The entirety of the above-mentioned patent application is hereby incorporated by reference herein and made a part of this specification.

BACKGROUND OF THE INVENTION

Field of the Invention

The invention relates to a projection screen.

Description of Related Art

Projection screen is widely used in daily life. For example, the projection screen is applied in educational institutions, command centers, conference rooms or exhibition centers, etc. An image beam projected by an external image source (for example, a projector) is adapted to be projected onto the projection screen, and image information carried by the image beam can be imaged on the projection screen to facilitate a user presenting expressing content to public through the projection screen. Therefore, the projection screen plays an important role in information transmission.

On the other hand, as electronic apparatuses are developed toward a trend of multifunction, a conventional button-type operation interface has been gradually unable to meet the needs of users. In this case, a touch technique is quickly developed. Compared with the conventional button-type operation interface, an input method of a touch operation interface is more convenient and intuitive, and a user can directly perform a touch input operation on a display surface of the electronic apparatus by using a finger or a stylus. Besides that the touch technique is applied to the display surface of the electronic apparatus, it can also be applied to a projection screen, such that the user can intuitively perform the touch input operation on the projection screen.

However, the conventional projection screen usually has following problems: in the conventional projection screen, optical microstructures thereon are generally exposed, and in case of impact of a foreign object or when the projection screen is retracted, the optical microstructures on the projection screen are liable to be damaged, which may cause a poor appearance of the projection screen or aggravate optical quality of a projected image. Moreover, the projection screen is liable to be contaminated by foreign matters (for example, suspended particles) adhered on the optical microstructures. When the projection screen is cleaned, it is liable to damage the optical microstructures of the projection screen. Therefore, the conventional projection screen has poor reliability.

On the other hand, in the conventional projection screen, the optical microstructures are arranged unidirectionally. When the user executes a touch operation on the conventional projection screen, the stylus or the finger cannot move smoothly in all directions. Meanwhile, the stylus or the finger is also liable to cause a damage of the optical microstructures.

Moreover, when a scattering capability of the projection screen itself is insufficient, the image beam is liable to be reflected towards a specific direction (for example, a reflection direction of the image beam). Therefore, when the user views the projection screen from certain viewing angles (for example, a reflection angle of the image beam), the user may feel that the image is over bright, and such phenomenon is the so-called "hot spot" phenomenon. Comparatively, when the user views the projection screen from other viewing angles, the user may feel that the image is over dark. In other words, under different viewing angles, the image may have different brightness, i.e. the projection screen has a phenomenon of uneven brightness. It is known that the hot spot phenomenon and the phenomenon of uneven brightness may all cause poor imaging quality of the image.

Therefore, how to resolve the above problem becomes a current focus of research and development for R&D personnel of the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projection screen, which has good reliability and imaging quality.

Other objects and advantages of the invention can be further illustrated by the technical features broadly embodied and described as follows.

In order to achieve one or a portion of or all of the objects or other objects, the invention provides a projection screen, which has an image-source side. The projection screen includes a substrate, a plurality of Fresnel structures and a protective layer. The Fresnel structures are located on a surface of the substrate facing the image-source side and arranged along a first direction. Each of the Fresnel structures extends along a second direction. The Fresnel structures are located between the substrate and the protective layer. The protective layer has a first surface facing the image-source side. The first surface has a plurality of optical microstructures. The optical microstructures are orthographically projected on a reference plane to correspondingly form a plurality of orthographic projection patterns on the reference plane. Each of the orthographic projection patterns has a first axis and a second axis substantially perpendicular to each other. The first axis of each of the orthographic projection patterns passes through two end points having a maximum distance in the first direction. The second axis of each of the orthographic projection patterns passes through two end points having a maximum distance in the second direction. Each of the orthographic projection patterns is symmetric relative to at least one of the first axis and the second axis.

According to the above descriptions, in the projection screen of the exemplary embodiment of the invention, as the Fresnel structures is located between the substrate and the protective layer, the protective layer may effectively protect the Fresnel structures, so that the projection screen of the exemplary embodiment of the invention has good reliability. Moreover, the protective layer has a plurality of randomly distributed optical microstructures thereon, and the optical, microstructures may scatter the image beam transmitted to the projection screen, so as to effectively avoid the hot spot phenomenon to improve the imaging quality of the image beam imaged on the projection screen, and the projection screen may have a better anti-glare function. Moreover, the first axis of each of the orthographic projection patterns of the optical microstructure on the reference plane passes through two end points having a maximum distance in the first direction, and the second axis of the orthographic projection pattern passes through two end points having a maximum distance in the second direction. Each of the orthographic projection patterns is symmetric relative to at least one of the first axis and the second axis. Due to the aforementioned projection relationship, an axial length of the orthographic projection pattern along the first axis corresponds to a distance between two end points of the optical microstructure having a maximum distance in the first direction, and an axial length of the orthographic projection pattern along the second axis corresponds to a distance between two end points of the optical microstructure having a maximum distance in the second direction. In the projection screen of the exemplary embodiment of the invention, by designing the lengths of the first axis and the second axis of the orthographic projection pattern, the scattering angle of the image beam reflected by the projection screen along different directions (a vertical direction or a horizontal direction) can be adjusted.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

In order to describe the configuration relationship of the projection screen of the exemplary embodiment in detail, the projection screen 100 of the exemplary embodiment can be regarded as being located in a space constructed by a first direction D1, a second direction D2 and a third direction D3, wherein the first direction D1 is a vertical direction. The second direction D2 is substantially perpendicular to the first direction D1, and the second direction D2 is, for example, a horizontal direction. Moreover, the third direction D3 is substantially perpendicular to the first direction D1 and the second direction D2, for example, substantially perpendicular to a first surface S1 of a protective layer 130.

Figure 1:
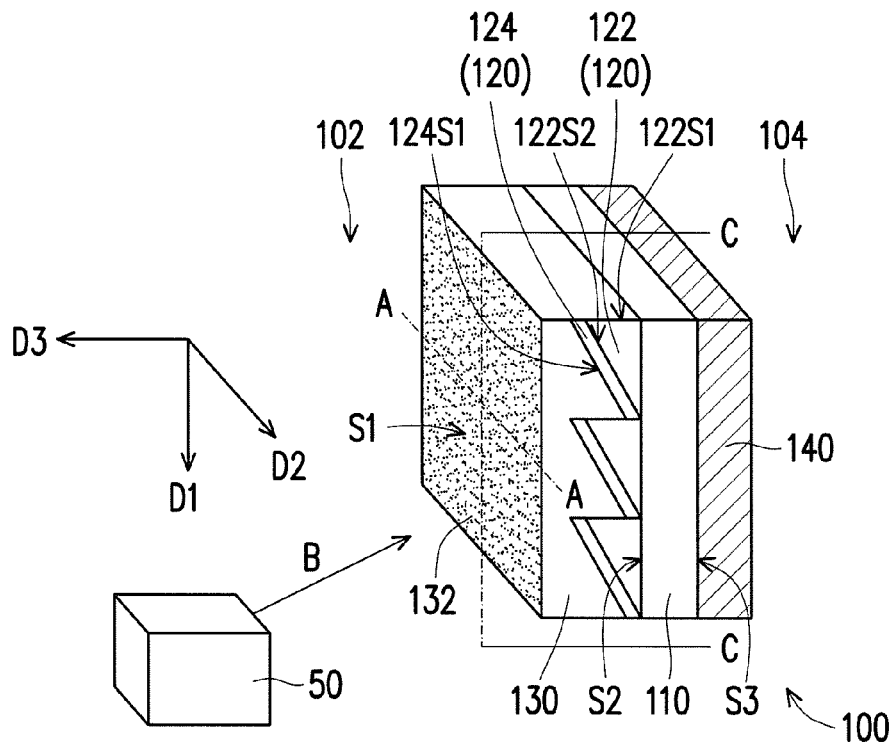
FIG. 1 is a schematic diagram of a projection screen according to an exemplary embodiment of the invention.

FIG. 1 is a schematic diagram of a projection screen according to an exemplary embodiment of the invention.

Referring to FIG. 1, in the exemplary embodiment, the projection screen 100 has an image-source side 102 and a back side 104 opposite to each other. An external image source 50 (for example, a general projector, a short throw projector, or an ultra-short throw projector) is disposed at the image-source side 102 of the projection screen 100, and is disposed at a relatively lower side of the projection screen 100. The image source 50 provides an image beam B to the projection screen 100, and the projection screen 100 is adapted to receive the image beam B, and the image beam B is adapted to form an image on the projection screen 100. A user may view an image on the projection screen 100 by the image beam B through the projection screen 100.

In the exemplary embodiment, the projection screen 100 includes a substrate 110, a plurality of Fresnel structures 120 and the protective layer 130. The protective layer 130 has a first surface S1 facing the image-source side 102, and the first surface S1 has a plurality of optical microstructures 132. The substrate 110 has a second surface S2 (a surface facing the image-source side 102) and a third surface S3 (a surface facing the back side 104) opposite to each other. The substrate 110 may be transparent substrate or non-transparent substrate. Various components in the projection screen 100 of the present exemplary embodiment are described in detail below.

In the exemplary embodiment, when the substrate 110 is a transparent substrate, a light-absorbing layer 140 is disposed on the third surface S3 of the substrate 110. In other words, the substrate 110 is located between the Fresnel structures 120 and the light-absorbing layer 140. A material of the light-absorbing layer 140 is, for example, a black coating, colloid doped with a black material or other material with high light-absorbing rate, which is not limited by the invention. In this case, viewing along a direction from the image-source side 102 of the projection screen 100 to the back side 104 of the projection screen 100, the arrangement of the various components of the projection screen 100 is sequentially the protective layer 130, the Fresnel structures 120, the transparent substrate 110 and the light-absorbing layer 140.

In other embodiments, when the substrate 110 is a non-transparent substrate, the light-absorbing layer 140 can be selectively disposed on the third surface S3 of the substrate 110, i.e. the light-absorbing layer 140 is unnecessary to be configured. Therefore, viewing along the direction from the image-source side 102 of the projection screen 100 to the back side 104 of the projection screen 100, the arrangement of the various components of the projection screen 100 is sequentially the protective layer 130, the Fresnel structures 120 and the non-transparent substrate 110, where a material of the non-transparent substrate 110 is, for example, a material with high light-absorbing rate.

In the exemplary embodiment, the Fresnel structures 120 are located on the surface S2 (the second surface S2) of the substrate 110 facing the image-source side 102 and are arranged along the first direction D1 (the vertical direction). Each of the Fresnel structures 120 extends along the second direction D2 (the horizontal direction), wherein the first direction D1 is different to the second direction D2. The Fresnel structures 120 are located between the substrate 110 and the protective layer 130. It should be noted that in the exemplary embodiment, three Fresnel structures 120 are illustrated, though in other exemplary embodiment that is not illustrated, the number of the Fresnel structures 120 is, for example, greater than three or smaller than three, which is not limited by the invention.

In detail, each of the Fresnel structures 120 includes a Fresnel body 122 and a reflective scattering layer 124. The Fresnel bodies 122 are arranged along the first direction D1 (the vertical direction), and each of the Fresnel bodies 122 extends along the second direction D2 (the horizontal direction), wherein the first direction D1 is different to the second direction D2. The Fresnel bodies 122 are located between the substrate 110 and the reflective scattering layer 124. To be specific, each of the Fresnel bodies 122 has a transmissive surface 122S1 and a disposition surface 122S2, wherein the transmissive surface 122S1 is connected to the disposition surface 122S2. The reflective scattering layer 124 is disposed on the disposition surface 122S2 of each of the Fresnel bodies 122, and the reflective scattering layer 124 has a reflective scattering surface 124S1 facing the image-source side 102, i.e. each of the reflective scattering surfaces 124S1 is connected to the corresponding transmissive surface 122S1, where each of the reflective scattering surfaces 124S1 and each of the transmissive surfaces 122S1 are all surfaces extending along the second direction D2. On the other hand, in the first direction D1, the reflective scattering surfaces 124S1 and the transmissive surfaces 122S1 are alternately configured. The reflective scattering surfaces 124S1 is, for example, relatively inclined to the second surface S2 of the substrate 110, and the transmissive surface 122S1 is, for example, substantially perpendicular to the second surface S2 of the substrate 110, the invention is not limited thereto.

The reflective scattering surface 124S1 faces a relatively lower side of the projection screen 100, and the transmissive surface 122S1 faces a relatively upper side of the projection screen 100. Due to the above configuration, the image beam B coming from the image source 50 disposed at the relatively lower side of the projection screen 100 can be directly transmitted to the reflective scattering surface 124S1. Comparatively, the image beam B is indirectly transmitted to the transmissive surface 122S1.

Moreover, in the exemplary embodiment, the material of each Fresnel body 122 is, for example, a transparent material, and is, for example, a light-curing polymer material. Scattering microstructures can be further added into the Fresnel body 122 to improve the scattering capability of the Fresnel body 122. Moreover, the user may suitably fill dyes into the Fresnel body 122 according to different color characteristic demands, so as to adjust color characteristics of the projection screen 100. In other exemplary embodiments, the material of the Fresnel body 122 is, for example, a non-transparent material, for example, a dye with a light-absorbing function is filled into the Fresnel body 122, such that the transmissive surface 122S1 of each of the Fresnel bodies 122 forms a light-absorbing surface for absorbing the received light beam, or a white dye is filled into the Fresnel body 122 to increase a light gain of the projection screen 100, and a light-absorbing material is coated on the transmissive surface 122S1 of each of the Fresnel bodies 122 to form a light-absorbing surface, so as to absorb the received light beam.

A material of the reflective scattering layer 124 is, for example, a metal layer or a non-metal layer. When the material of the reflective scattering layer 124 is a metal layer, the reflective scattering layer 124 is, for example, an aluminium layer, a silver layer or a combination thereof; and when the material of the reflective scattering layer 124 is a non-metal layer, the reflective scattering layer 124 is, for example, a $TiO_2$ layer, a barium sulfate layer or a combination thereof, which is not limited by the invention.

In the exemplary embodiment, the reflective scattering surface 124S1 is, for example, a flat inclined surface. In other exemplary embodiments that are not illustrated, the reflective scattering surface 124S1 is, for example, a concave surface, a convex surface or other free-form surface, which is not limited by the invention. It should be noted that scattering microstructures can be selectively configured on the reflective scattering surface 124S1, and when the image beam B is transmitted to the reflective scattering surface 124S1, the scattering microstructures configured on the reflective scattering surface 124S1 may further aid scattering the image beam B.

Since the Fresnel structures 120 are located between the substrate 110 and the protective layer 130, i.e. the protective layer 130 covers the reflective scattering surface 124S1 and the transmissive surface 122S1 of each of the Fresnel structures 120, the protective layer 130 may effectively protect the Fresnel structures 120 in the projection screen 100. Moreover, a material of the protective layer 130 is, for example, a relative stain-resistant material, so that the Fresnel structures 120 are avoided to be adhered with foreign matters (suspended particles). Meanwhile, when the projection screen 100 is to be cleaned, it is not easy to damage the Fresnel structures 120.

Figure 2:
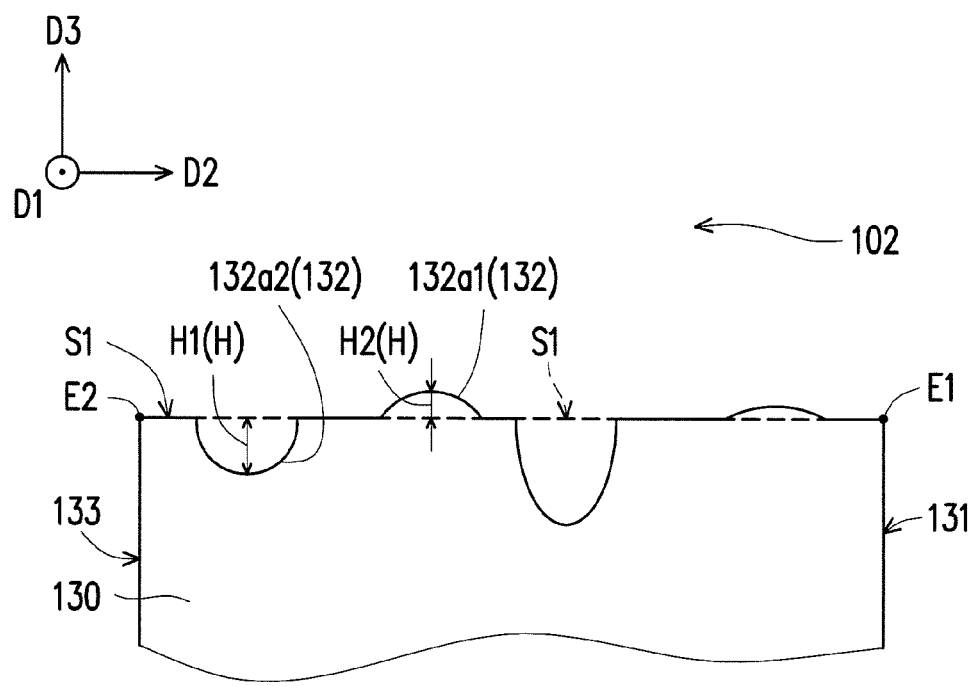
FIG. 2 is a microcosmic view of a first surface of a protective layer of FIG. 1 viewing along a section line A-A.

FIG. 2 is a microcosmic view of the first surface of the protective layer of FIG. 1 viewing along a section line A-A.

Referring to FIG. 2, the protective layer 130 has the first surface S1 facing the image-source side 102, and the optical microstructures 132 are closely and randomly disposed on the first surface S1, where the first surface S1 can be a plane. The protective layer 130 includes two surfaces 131 and 133 opposite to each other, where the two surfaces 131 and 133 are substantially parallel to each other. The first surface S1 of the protective layer 130 is, for example, connected to a side edge E1 (which is parallel to the first direction D1 and perpendicular to the second direction D2 and the third direction D3) of the surface 131, and is, for example, connected to a side edge E2 (which is parallel to the first direction D1 and perpendicular to the second direction D2 and the third direction D3) of the surface 133. In the exemplary embodiment, a part of the first surface S1 is a virtual plane (shown by dot lines of FIG. 2).

As described above, in the exemplary embodiment, a part of the optical microstructures 132 (132a1) protrude out from the first surface S1 of the protective layer 130 (two optical microstructures 132a1 are schematically illustrated in FIG. 2), and another part of the optical microstructures 132 (132a2) are recessed into the first surface S1 of the protective layer 130 (two optical microstructures 132a2 are schematically illustrated in FIG. 2). In an exemplary embodiment, the optical microstructures 132, for example, all protrude out from the first surface S1 of the protective layer 130. In another exemplary embodiment, the optical microstructures 132 are, for example, all recessed into the first surface S1 of the protective layer 130. Protrusion, recess or a combination of protrusion and recess of the optical microstructures 132 is not limited by the invention.

Then, in the exemplary embodiment, maximum distances H between each of the optical microstructures 132 and the first surface S1 are different, as shown in FIG. 2, the maximum distances H are maximum depths between the optical microstructures 132 and the first surface S1 of the protective layer 130 along the third direction D3. As shown in FIG. 2, the maximum distance H2 between the optical microstructures 132a1 and the first surface S1 is smaller than the maximum distance H1 between the optical microstructures 132a2 and the first surface S1. In other embodiment that is not illustrated, the maximum distances H between each of the optical microstructures 132 and the first surface S1 are, for example, substantially the same. Alternatively, the maximum distance between a part of the optical microstructures 132 and the first surface S1 are, for example, substantially the same, and the maximum distance between the other part of the optical microstructures 132 and the first surface S1 are different, which is not limited by the invention.

Referring to FIG. 1, to be specific, in the exemplary embodiment, the optical microstructures 132 are closely and randomly disposed on the first surface S1 of the protective layer 130. Preferably, a ratio between a sum of surface areas of the optical microstructures 132 orthographically projected on the first surface S1 of the protective layer 130 and a total surface area of the first surface S1 falls within a range between 80% and 100%. Based on the aforementioned design of the optical microstructures 132, the projection screen 100 may have an anti-glare function. Moreover, in the exemplary embodiment, a method for forming the optical microstructures 132 is, for example, UV embossing or hot embossing, and a mold making method thereof can be blast processing, etching, or laser processing, etc., and the invention is not limited to the aforementioned forming methods of the optical microstructures.

In other exemplary embodiment that are not illustrated, the protective layer 130 is, for example, a conformal coating with the Fresnel structures 120, i.e. the first surface S1 of the protective layer 130 can be non-planar along with shapes of the Fresnel structures 120.

Figure 3A:
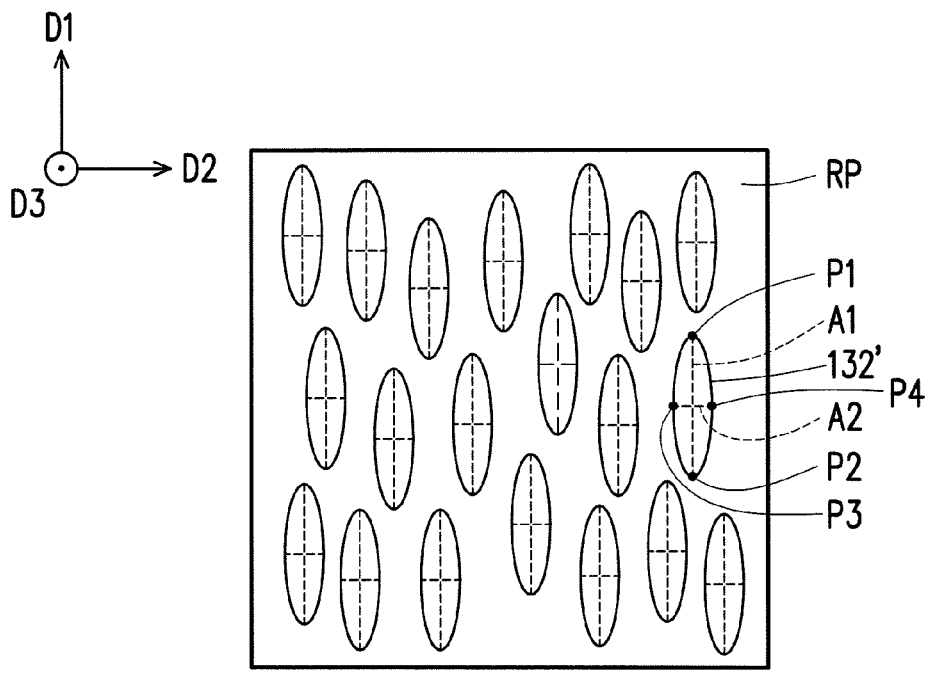
FIG. 3A and FIG. 3B are respectively projection schematic diagrams of a part of optical microstructures orthographically projected to a reference plane according to different exemplary embodiments of the invention.
Figure 3B:
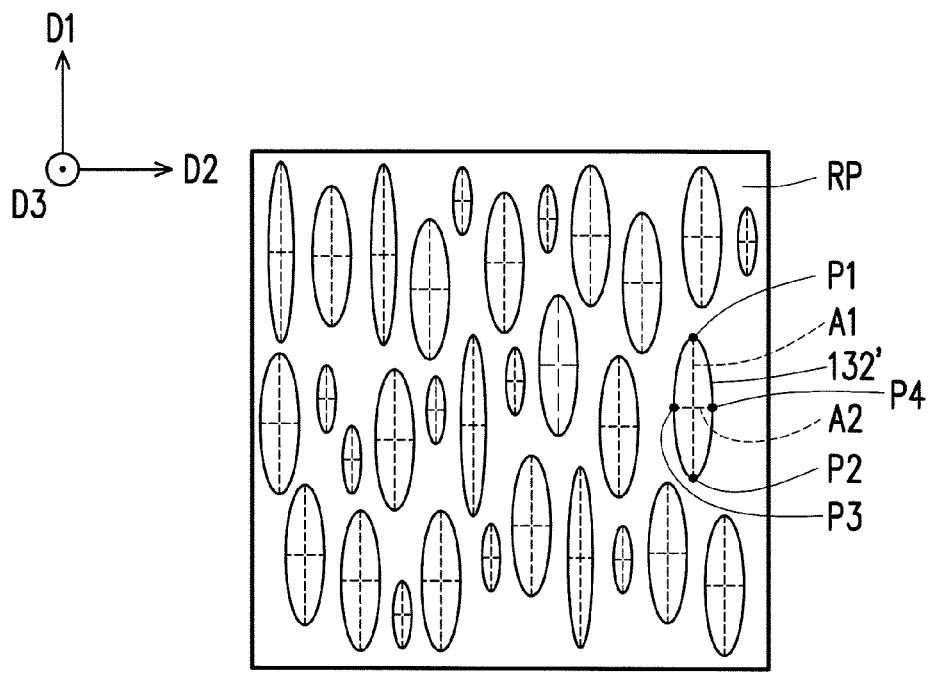

FIG. 3A and FIG. 3B are respectively projection schematic diagrams of a part of the optical microstructures orthographically projected to a reference plane according to different exemplary embodiments of the invention.

Referring to FIG. 1 and FIG. 3A, the optical microstructures 132 are orthographically projected on a reference plane RP and correspondingly form a plurality of orthographic projection patterns 132' on the reference plane RP (for example, in one-to-one correspondence). The reference plane RP is, for example, a plane defined by the first direction D1 and the second direction D2. The reference plane RP is substantially parallel to the second surface S2 of the substrate 110 facing the image-source side 102 or the third surface S3 of the substrate 110 facing the back side 104. In other words, from the microscopic point of view, when the user views the projection screen 100 by directly viewing the first surface S1 of the protective layer 130 from the image-source side 102, the user may view the orthographic projection patterns 132' shown in FIG. 3A.

In detail, each of the orthographic projection patterns 132' has a first axis A1 and a second axis A2, wherein the first axis A1 of each of the orthographic projection patterns 132' passes through two end points P1 and P2 of the orthographic projection pattern 132' having a maximum distance in the first direction D1 and an axial length along the first axis A1 is formed between the end points P1 and P2 of the orthographic projection pattern 132'. The second axis A2 of each of the orthographic projection patterns 132' passes through two end points P3 and P4 of the orthographic projection pattern 132' having a maximum distance in the second direction D2 and an axial length along the second axis A2 is formed between the end points P3 and P4 of the orthographic projection pattern 132'. Each of the orthographic projection patterns 132' is symmetric relative to at least one of the first axis A1 and the second axis A2. Preferably, each of the orthographic projection patterns 132' is symmetric relative to the first axis A1, and the axial length along the first axis A1 is greater than the axial length along the second axis A2. More preferably, each of the orthographic projection patterns 132' has a length ratio between the axial length along the first axis A1 and the axial length along the second axis A2 is greater than or equal to 1.2. Moreover, in the exemplary embodiment, the length of each orthographic projection pattern 132' along the second axis A2 ranges between 10 µm and 200 µm.

In the exemplary embodiment, the axial lengths of the orthographic projection patterns 132' along the first axes A1 are substantially the same, and the axial lengths of the orthographic projection patterns 132' along the second axes A2 are substantially the same.

On the other hand, referring to FIG. 3B, the exemplary embodiment of FIG. 3B is similar to the exemplary embodiment of FIG. 3A, and a main difference between FIG. 3B and FIG. 3A is that the axial lengths of each of the orthographic projection patterns 132' along the first axes A1 are different to each other, and the axial lengths of each of the orthographic projection patterns 132' of the first axes A2 are different to each other.

An optical situation of the image beam B entering the projection screen 100 is described in detail below.

Figure 4A:
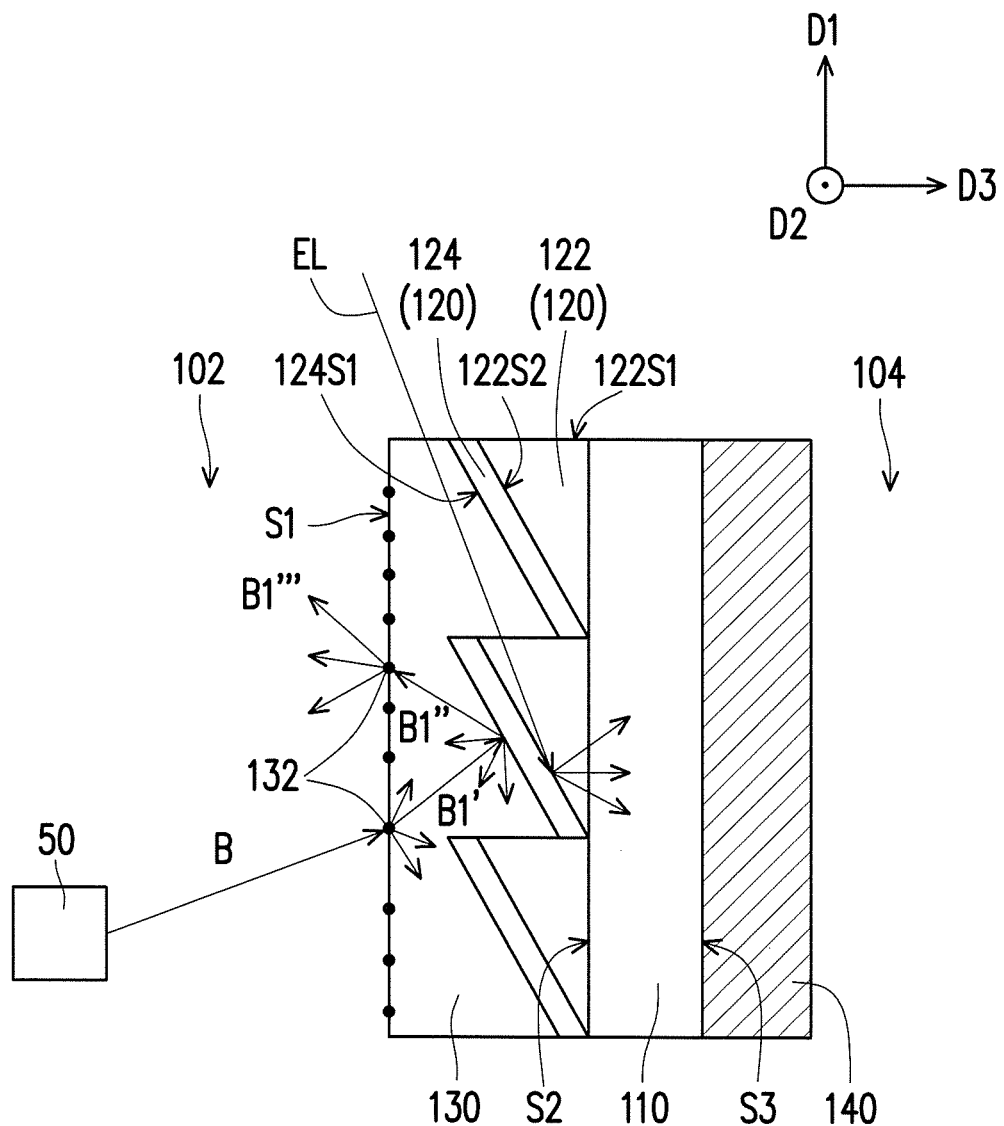
FIG. 4A is a cross-sectional view of FIG. 1 viewing along a section line C-C.
Figure 4B:
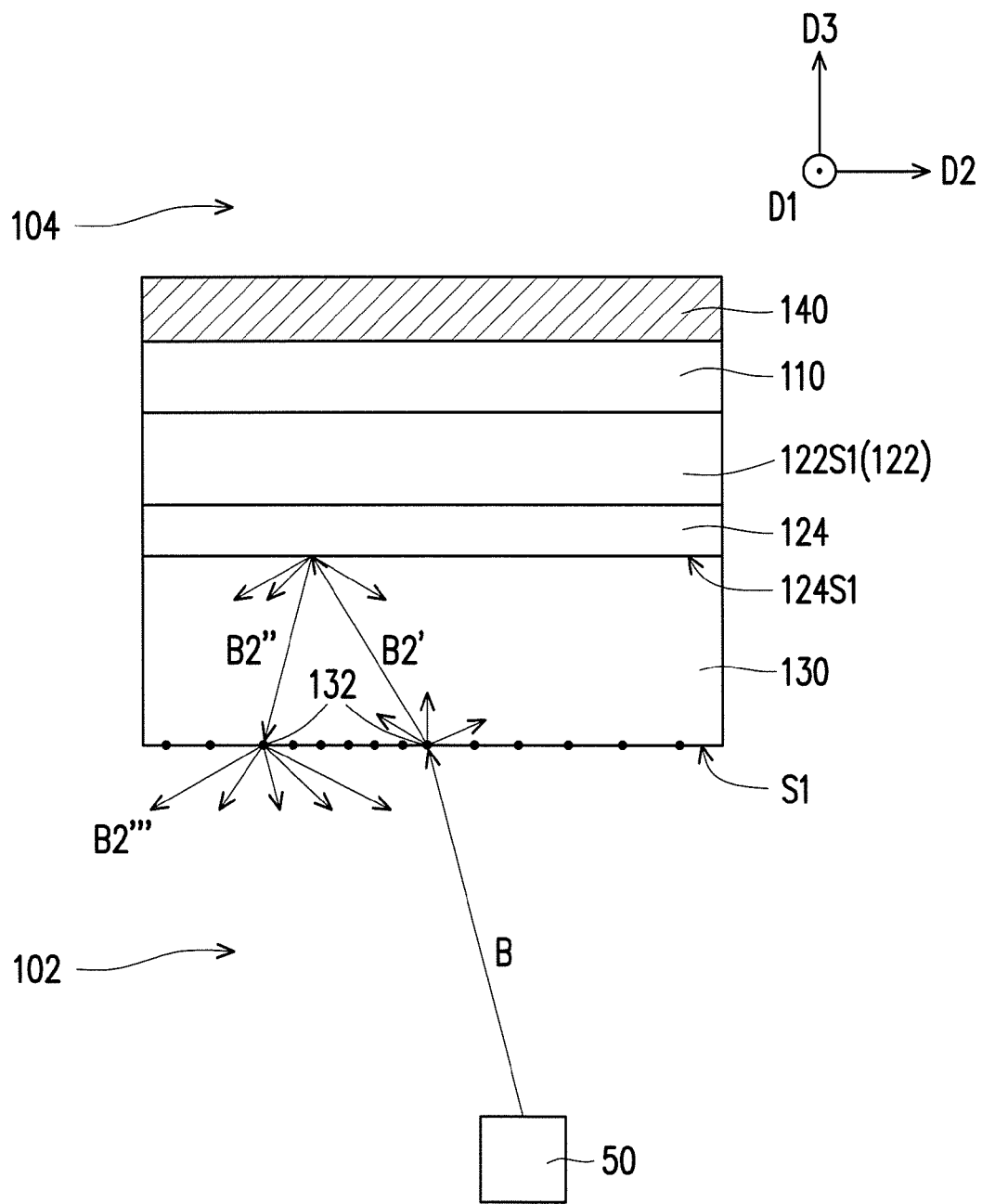
FIG. 4B is a cross-sectional view of FIG. 1 viewing along a section line A-A.

FIG. 4A is a cross-sectional view of FIG. 1 viewing along a section line C-C. FIG. 4B is a cross-sectional view of FIG. 1 viewing along a section line A-A.

Referring to FIG. 4A and FIG. 4B, the image beam B is provided by the image source 50 and is transmitted to the projection screen 100. To be specific, the image beam B is sequentially transmitted to the optical microstructures 132 on the first surface S1 of the protective layer 130, and after the image beam B penetrates through the protective layer 130, a scattering angle of the image beam B in the first direction D1 (the vertical direction) and a scattering angle of the image beam in the second direction D2 (the horizontal direction) are respectively changed by the optical microstructures 132. Change of the scattering angles in different directions (the horizontal direction and the vertical direction) is discussed below.

Referring to FIG. 4A, regarding the scattering angle in the first direction D1 (the vertical direction), the image beam B is scattered and refracted by the optical structures 132 to form a plurality of primary sub image beams B1', wherein one stream of the primary sub image beam (i.e. the changed image beam) in FIG. 4A is taken as an example to describe the subsequent light transmission path, and "number of prime symbol" refers to the number of times that the sub image beam is scattered. The scattering angles of the primary sub image beams B1' in the first direction D1 (the vertical direction) is enlarged by the optical microstructures 132. Then, the primary sub image beam B1' is transmitted to the reflective scattering surface 124S1 of the Fresnel structures 120, and is scattered and reflected by the reflective scattering surface 124S1 to form a plurality of secondary sub image beams B1", where one stream of the secondary sub image beam B1" in FIG. 4A is taken as an example to describe the subsequent light transmission path. The secondary sub image beam B1" passes through the protective layer 130, and is again transmitted to the optical microstructures 132 on the first surface S1 of the protective layer 130, and the secondary sub image beams B1" is again scattered and refracted by the optical structures 132 to form a plurality of tertiary sub image beams B1'''. Therefore, the scattering angles of the tertiary sub image beams B1''' in the first direction D1 (the vertical direction) are further enlarged by the optical microstructures 132, and the tertiary sub image beams B1''' are emitted out of the projection screen 100. In this way, in the exemplary embodiment, the optical microstructures 132 may effectively enlarge the scattering angle of the image beam B in the first direction D1 (the vertical direction).

Moreover, since the transmissive surface 122S1 of each Fresnel structure 120 faces the relatively upper side of the projection screen 100, when an environment light EL (for example, an environment light emitted by a fluorescent tube or other light source) coming from the relatively upper side of the projection screen 100 is incident to the projection screen 100, most of the environment light EL is directly transmitted to the transmissive surfaces 122S1 of the Fresnel structures 120. In the embodiment, after the transmissive surface 122S1 of each transparent Fresnel body 122 receives the environment light EL, the environment light EL is reflected and scattered by the reflective scattering layer 124 on the corresponding Fresnel body 122 and is transmitted to the light-absorbing layer 140, and the light-absorbing layer 140 absorbs a part of the environment light EL. In other exemplary embodiment, the transmissive surface 122S1 of each non-transparent Fresnel body 122 is a light-absorbing surface, and is configured to directly absorb the received environment light EL. Therefore, the environment light EL is not emitted out from the projection screen 100 to influence image display quality. In this way, the projection screen 100 of the embodiment has an anti-ambient light function, and a contrast and anti-ambient light capability of the projection screen 100 are enhanced.

Referring to FIG. 4B, regarding the scattering angle in the second direction D2 (the horizontal direction), the image beam B is scattered and refracted by the optical structures 132 to form a plurality of primary sub image beams B2', wherein one stream of the primary sub image beam B2' (i.e. the changed image beam) in FIG. 4B is taken as an example to describe the subsequent light transmission path, and "number of prime symbol" refers to the number of times that the sub image beam is scattered. The scattering angles of the primary sub image beams B2' in the second direction D1 (the horizontal direction) is enlarged by the optical microstructures 132. Then, the primary sub image beam B2' is transmitted to the reflective scattering surface 124S1 of the corresponding Fresnel structure 120, and is scattered and reflected by the reflective scattering surface 124S1 to form a plurality of secondary sub image beams B2", wherein one stream of the secondary sub image beam B2" in FIG. 4A is taken as an example to describe the subsequent light transmission path. The secondary sub image beam B2" passes through the protective layer 130, and is again transmitted to the optical microstructures 132 on the first surface S1 of the protective layer 130, and the secondary sub image beam B2" is again scattered and refracted by the optical structures 132 to form a plurality of tertiary sub image beams B2'''. Therefore, the scattering angles of the tertiary sub image beams B2''' in the second direction D2 (the horizontal direction) are further enlarged by the optical microstructures 132, and the tertiary sub image beams B2''' are emitted out of the projection screen 100. In this way, in the exemplary embodiment, the optical microstructures 132 may effectively enlarge the scattering angle of the image beam B in the second direction D2 (the horizontal direction).

As described above, since the optical microstructures 132 are closely and randomly disposed on the first surface S1 of the protective layer 130, the optical microstructures 132 may scatter the image beam B transmitted to the projection screen 100, so as to effectively avoid the hot spot phenomenon and improve the imaging quality of the image beam B projected to the projection screen 100.

FIG. 5A to FIG. 5F are different exemplary embodiments of the orthographic projection patterns.

Figure 5A:
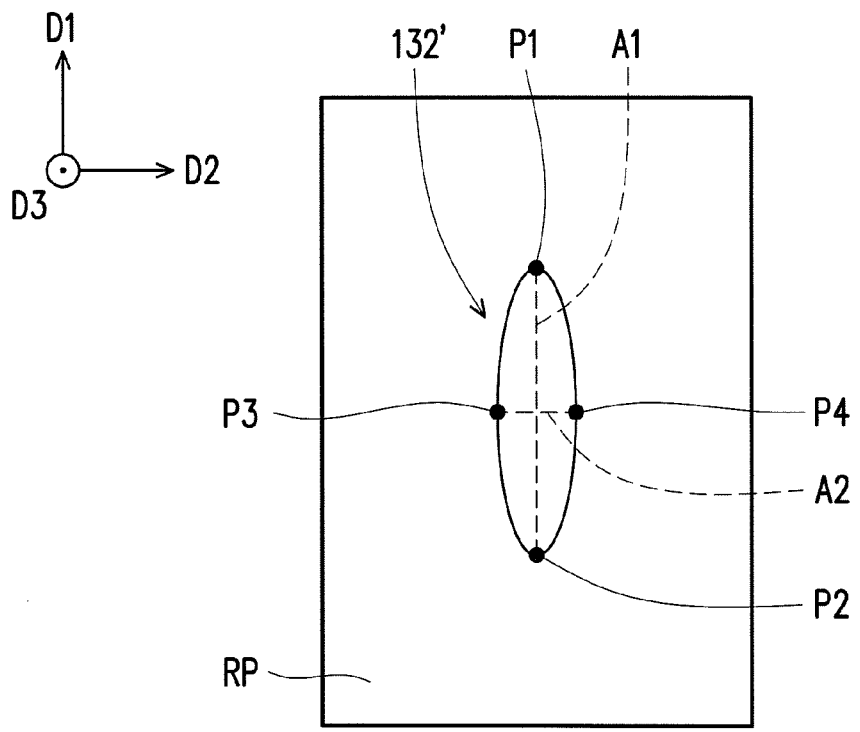
FIG. 5A to FIG. 5F are different exemplary embodiments of orthographic projection patterns.
Figure 5B:
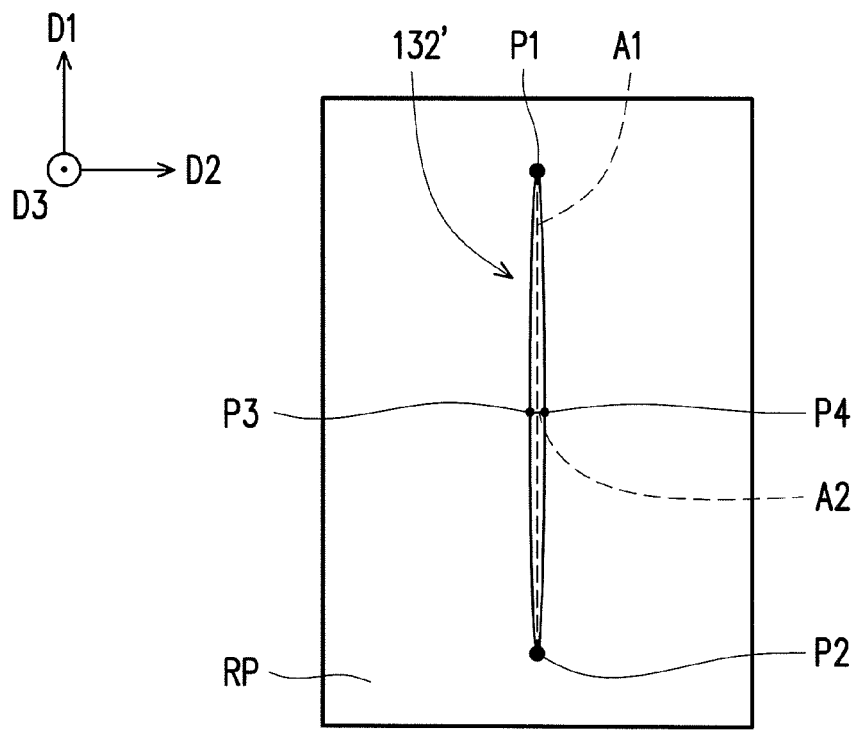
Figure 5C:
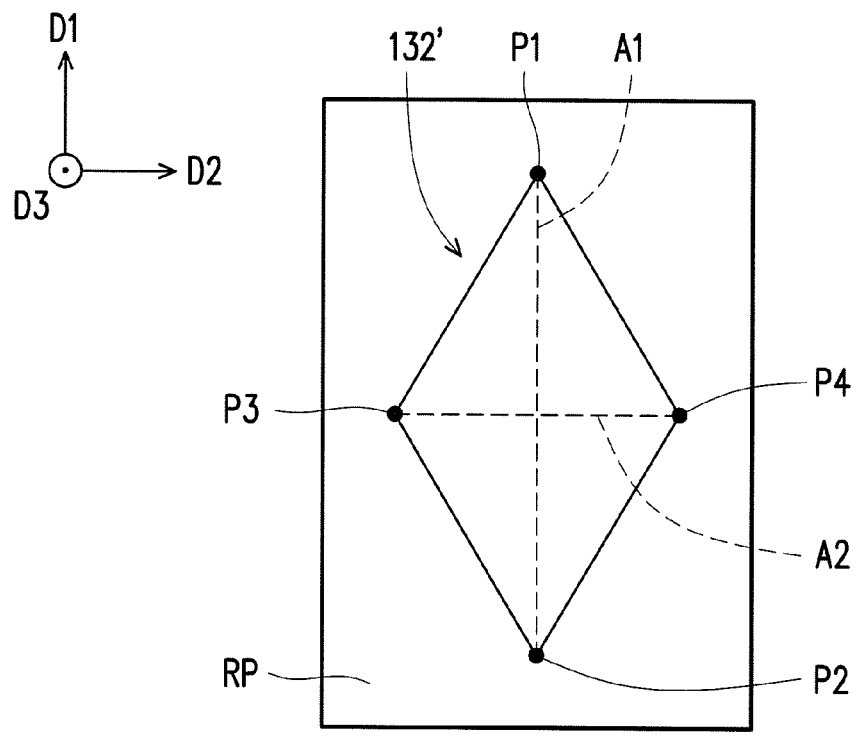

Referring to FIG. 5A to FIG. 5C, in the different exemplary embodiments of FIG. 5A to FIG. 5C, each of the orthographic projection patterns 132' is symmetric relative to the corresponding first axis A1 (which is parallel to the first direction D1) and symmetric relative to the corresponding second axis A2 (which is parallel to the second direction D2) on the reference plane RP. Referring to FIG. 5A, in an exemplary embodiment, the shape of each of the orthographic projection patterns 132' on the reference plane RP is substantially an oval. Referring to FIG. 5B, in another exemplary embodiment, the shape of each of the orthographic projection patterns 132' on the reference plane RP is substantially a hairline. Referring to FIG. 5C, in still another exemplary embodiment, the shape of each of the orthographic projection patterns 132' on the reference plane RP is substantially a rhombus.

Figure 5D:
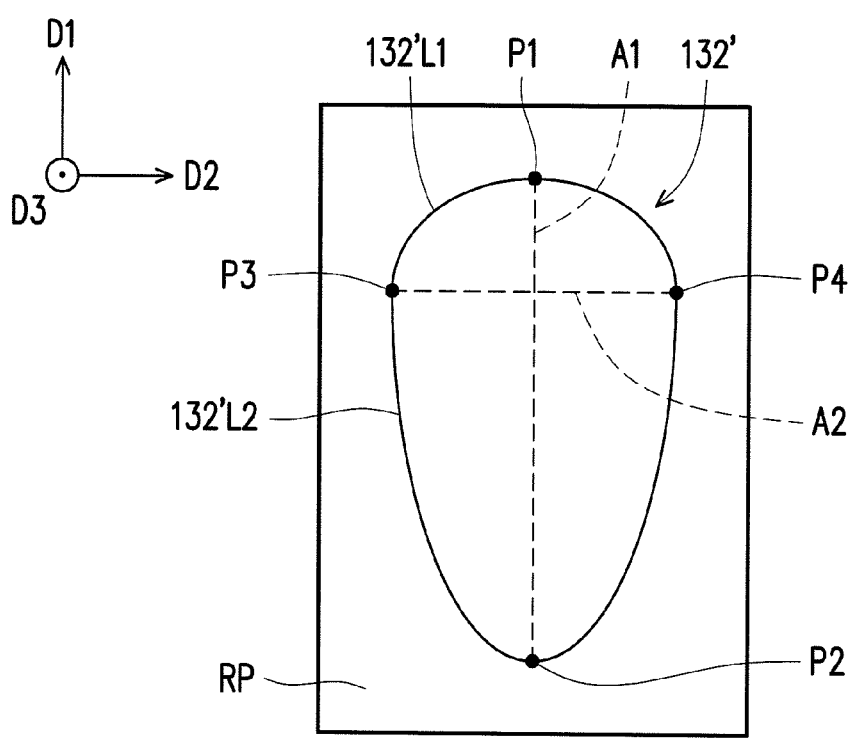
Figure 5E:
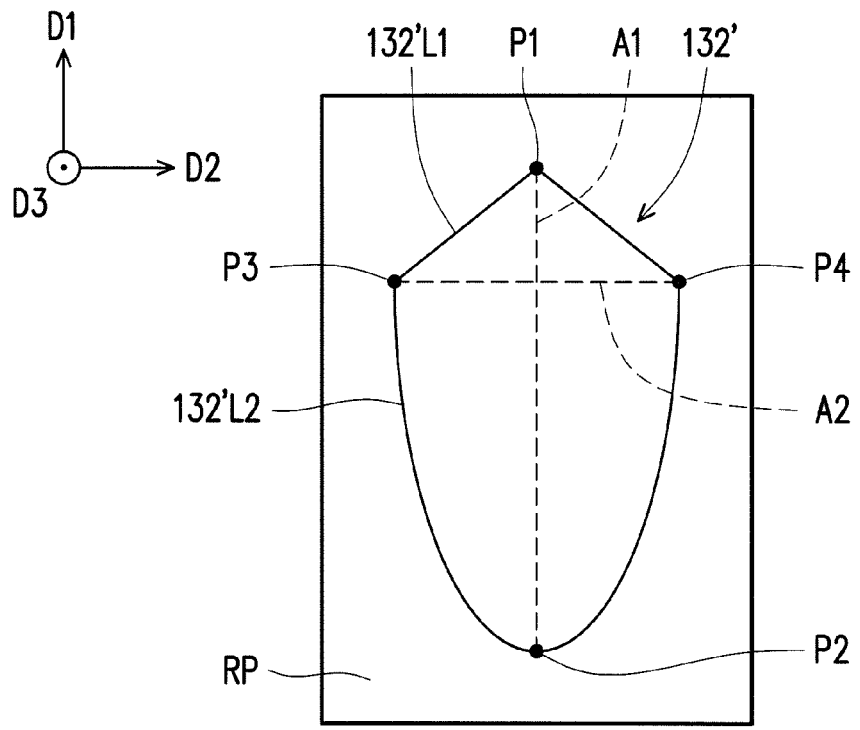
Figure 5F:
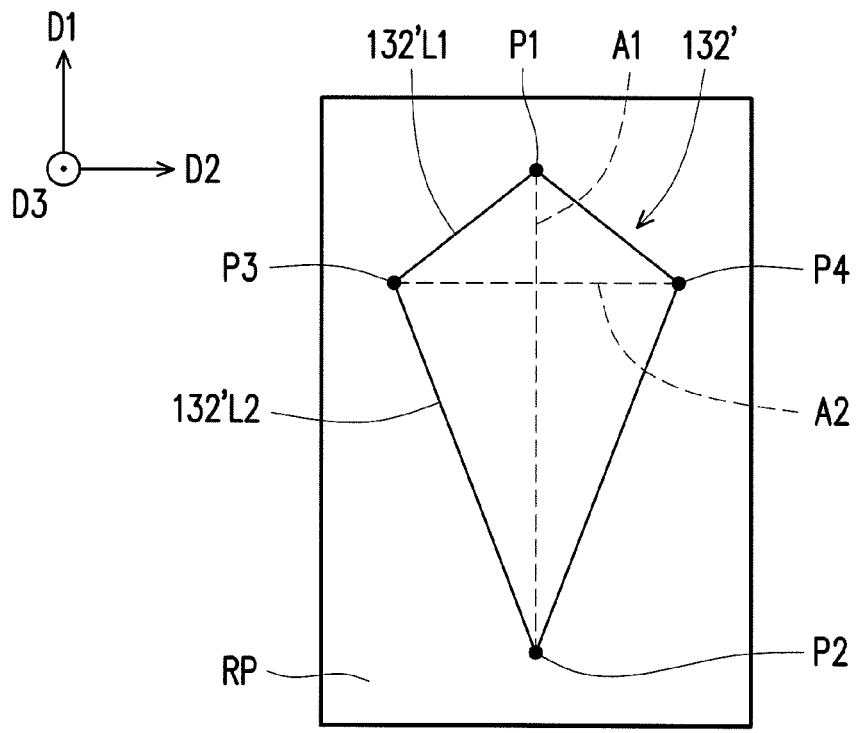

Referring to FIG. 5D to FIG. 5F, in the different exemplary embodiments of FIG. 5D to FIG. 5F, each of the orthographic projection patterns 132' is symmetric relative to the corresponding first axis A1 (which is parallel to the first direction D1) and is not symmetric relative to the corresponding second axis A2 (which is parallel to the second direction D2) on the reference plane RP. To be specific, each of the orthographic projection patterns 132' includes a first projection line 132'L1 and a second projection line 132'L2. The first projection line 132'L1 and the second projection line 132'L2 of each orthographic projection pattern 132' are intersected at two end points P3 and P4 of the orthographic projection pattern 132' having a maximum distance in the second direction D2. The first projection line 132'L1 and the second projection line 132'L2 are located at two opposite sides of the second axis A2 on the reference plane RP. The first projection line 132'L1 is located at an upper side of the second axis A2 in FIG. 5D to FIG. 5F, and the second projection line 132'L2 is located at a lower side of the second axis A2 in FIG. 5D to FIG. 5F. The first projection line 132'L1 and the second projection line 132'L2 are selected from a part of an oval circumference of one or a plurality of ovals or a part of a side of one or a plurality of rhombuses. As shown in FIG. 5D, the first projection line 132'L1 and the second projection line 132'L2 are respectively selected from a part of an oval circumference of different ovals, and the orthographic projection pattern 132' shown in FIG. 5D is, for example, a non-symmetric oval composed of a part of an oval circumference of two different ovals. As shown in FIG. 5E, the first projection line 132'L1 is selected from a part of a side of one rhombus, and the second projection line 132'L2 is selected from a part of an oval circumference of an oval, and the orthographic projection pattern 132' shown in FIG. 5E is, for example, an orthographic projection pattern composed of a part of an oval circumference of an oval and a part of a side of one rhombus. As shown in FIG. 5F, the first projection line 132'L1 and the second projection line 132'L2 are respectively selected from a part of sides of different rhombuses, and the orthographic projection pattern 132' shown in FIG. 5F is, for example, a non-symmetric rhombus (for example, a kite-shaped) composed of a part of sides of two different rhombuses.

Figure 6A:
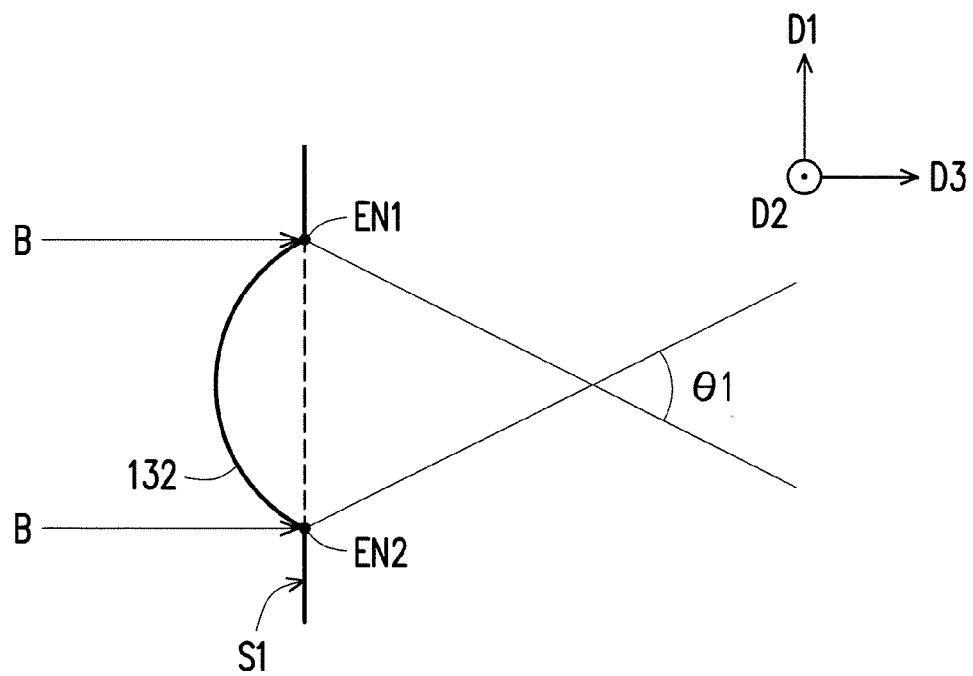
FIG. 6A is a cross-sectional view of passing through two end points of one optical structure having the maximum distance in a first direction.
Figure 6B:
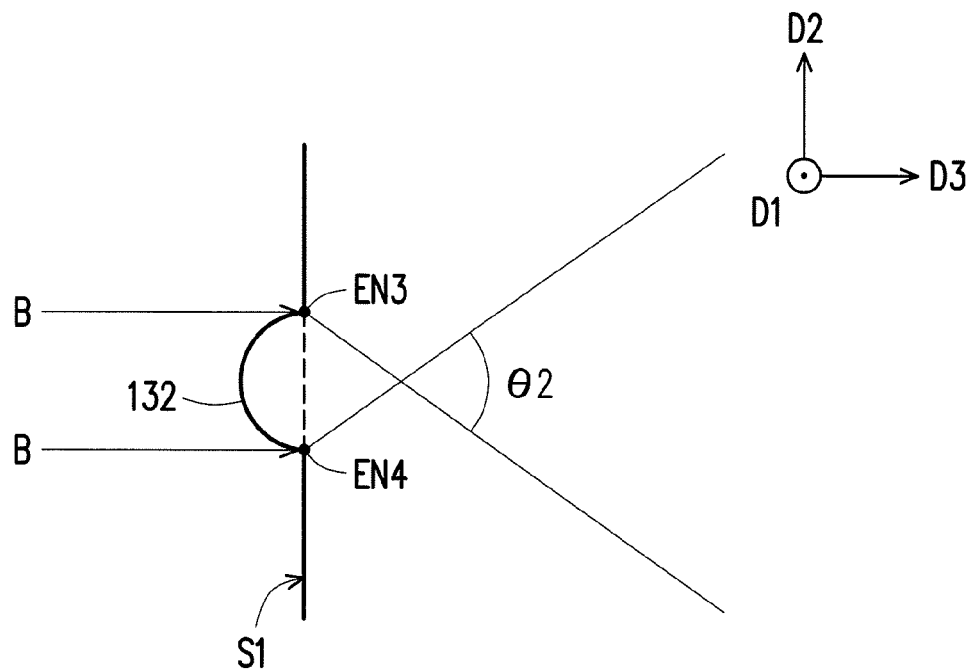
FIG. 6B is a cross-sectional view of passing through two end points of the optical structure of FIG. 6A having the maximum distance in a second direction.

FIG. 6A is a cross-sectional view of passing through two end points of one optical structure having the maximum distance in the first direction. FIG. 6B is a cross-sectional view of passing through two end points of the optical structure of FIG. 6A having the maximum distance in the second direction. For clarity's sake, only the image beam, the first surface of the protective layer and the optical microstructure are illustrated in FIG. 6A and FIG. 6B, and other components are omitted.

Referring to FIG. 5A, FIG. 6A and FIG. 6B, in the exemplary embodiment, the optical microstructure 132 is, for example, an ellipsoid, and the corresponding orthographic projection pattern 132' obtained by orthographically projecting the optical microstructure 132 to the reference plane RP is shown in FIG. 5A. From the microscopic point of view, the image beam B located adjacent to the optical microstructure 132 is substantially parallel incident to the optical microstructure 132. According to FIG. 6A and FIG. 6B, it is known that a distance between two end points EN1 and EN2 of the optical microstructure 132 having the maximum distance in the first direction D1 is greater than a distance between two end points EN3 and EN4 of the optical microstructure 132 having the maximum distance in the second direction D2 (i.e. the axial length along the first axis A1 of the orthographic projection pattern 132' of FIG. 5A is greater than the axial length along the second axis A2). Since the distance between the two end points EN1 and EN2 is greater than the distance between the two end points EN3 and EN4, based on an optical imaging principle, compared to the image beam B of FIG. 6B, the image beam B of FIG. 6A is focused at a farther distance through the optical microstructure 132 for emitting out. In FIG. 6A and FIG. 6B, the two end points EN1 and EN2 of the optical microstructure 132 having the maximum distance in the first direction D1 and the two end points EN3 and EN4 of the optical microstructure 132 having the maximum distance in the second direction D2 are, for example, all points on the first surface S1.

Therefore, by designing the maximum distance between the two end points EN1 and EN2 of the optical microstructure 132 in the first direction D1 and the maximum distance between the two end points EN3 and EN4 of the optical microstructure 132 in the second direction D2, and the maximum distance in the first direction D1 is greater than the maximum distance in the second direction D2 (the maximum distance in the first direction D1 and the maximum distance in the second direction D2 respectively correspond to the axial length along the first axis A1 and the axial length along the second axis A2 of the orthographic projection pattern 132' in FIG. 5A), the optical microstructures 132 may adjust a scattering angle θ1 of the image beam B in the first direction D1 and a scattering angle θ2 of the image beam B in the second direction D2. Namely, according to different circumstances, the user may design the maximum distance of the optical microstructure 132 in the first direction D1 (i.e. the axial length along the first axis A1) and the maximum distance of the optical microstructure 132 in the second direction D2 (i.e. the axial length along the second axis A2), such that the optical microstructure 132 may provide different scattering effects to the image beam B in the first direction D1 (the vertical direction) and the second direction D2 (the horizontal direction).

Referring to FIG. 6A and FIG. 6B, to be specific, the scattering angle θ1 of the image beam B in the first direction D1 is smaller than the scattering angle θ2 of the image beam B in the second direction D2. Therefore, after the image beam B passes through the optical microstructure 132, the scattering angle of the image beam B can be enlarged in the second direction D2 (the horizontal direction) and the scattering angle of the image beam B can be decreased in the first direction D1 (the vertical direction), such that the image beam B in the first direction D1 is converged, so as to improve a brightness gain of the projection screen 100. According to the above design, the projection screen 100 of the exemplary embodiment can be adapted to an ultra-short throw projection system.

Figure 6C:
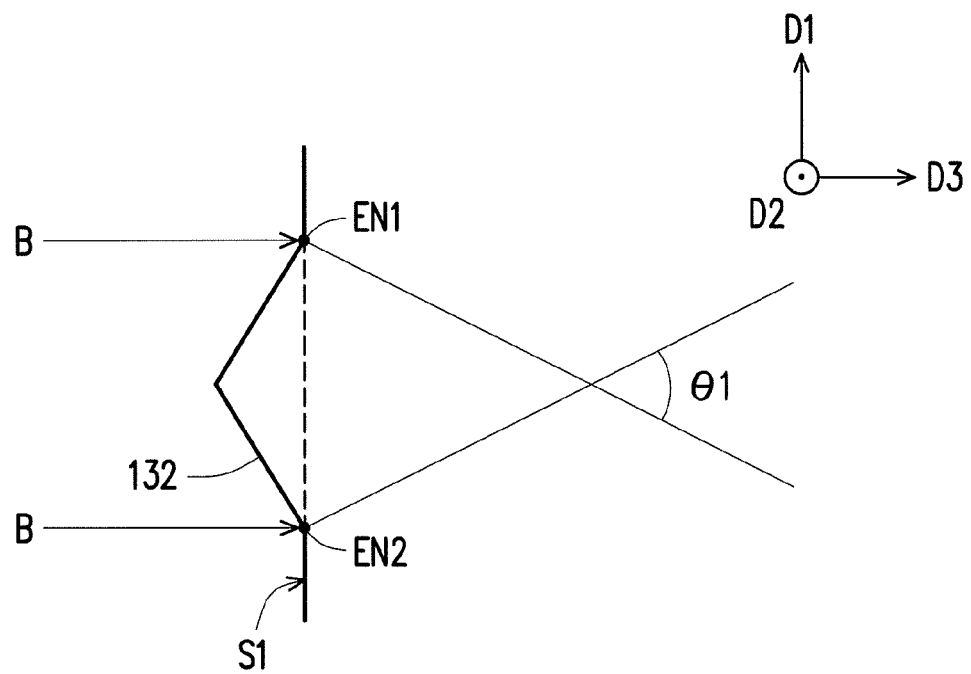
FIG. 6C is a cross-sectional view of passing through two end points of another optical structure having the maximum distance in the first direction.
Figure 6D:
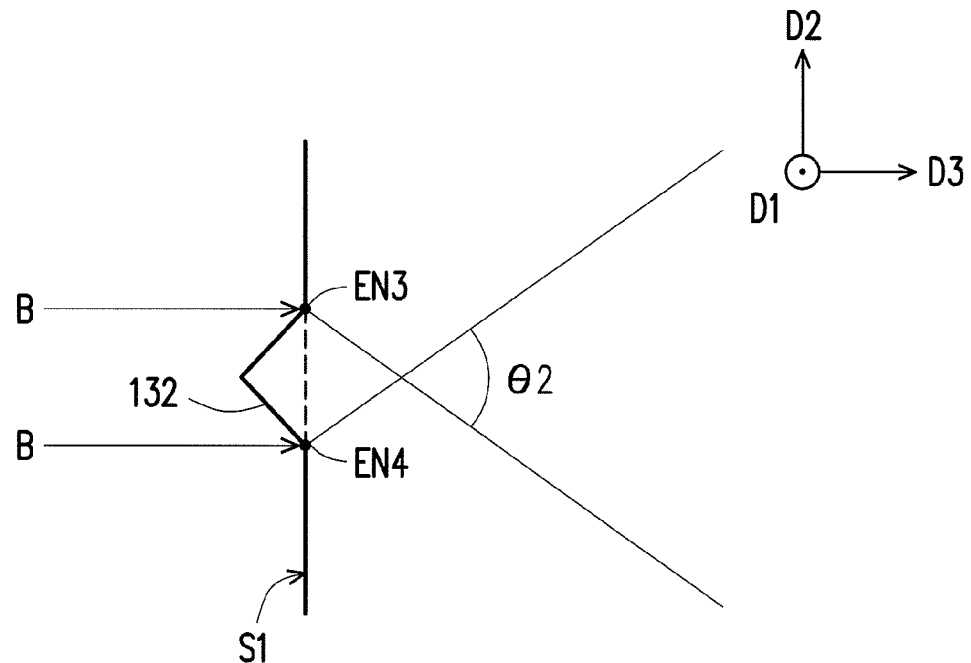
FIG. 6D is a cross-sectional view of two end points of the optical structure of FIG. 6C having the maximum distance in the second direction.

FIG. 6C is a cross-sectional view of passing through two end points of another optical structure having the maximum distance in the first direction. FIG. 6D is a cross-sectional view of passing through two end points of the optical structure of FIG. 6C having the maximum distance in the second direction. For clarity's sake, only the first surface of the protective layer, the image beam and the optical microstructure are illustrated in FIG. 6C and FIG. 6D, and other components are omitted.

Referring to FIG. 5C, FIG. 6C and FIG. 6D, the optical effect of the exemplary embodiment of FIG. 6C and FIG. 6D is similar to the optical effect of the exemplary embodiment of FIG. 6A and FIG. 6B, and detail thereof is not repeated, and a main difference therebetween is that in the exemplary embodiment, the optical microstructure 132 is, for example, a rhombus column, and the orthographic projection pattern 132' orthographically projected to the reference plane RP by the optical microstructure 132 is shown in FIG. 5C.

Figure 7A:
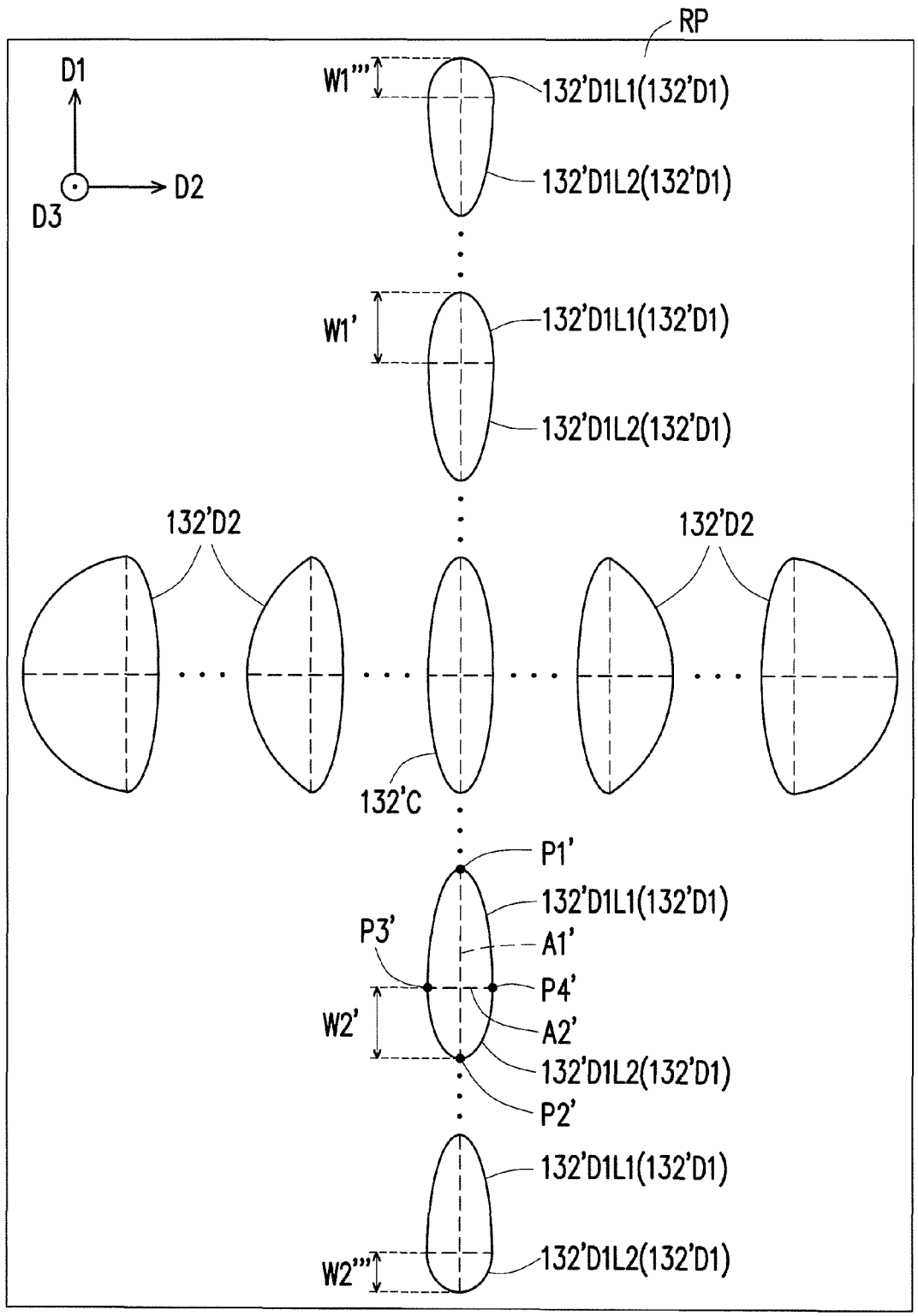
FIG. 7A and FIG. 7B are projection schematic diagrams of an optical microstructure orthographically projected to a reference plane according to an exemplary embodiment of the invention.
Figure 7B:
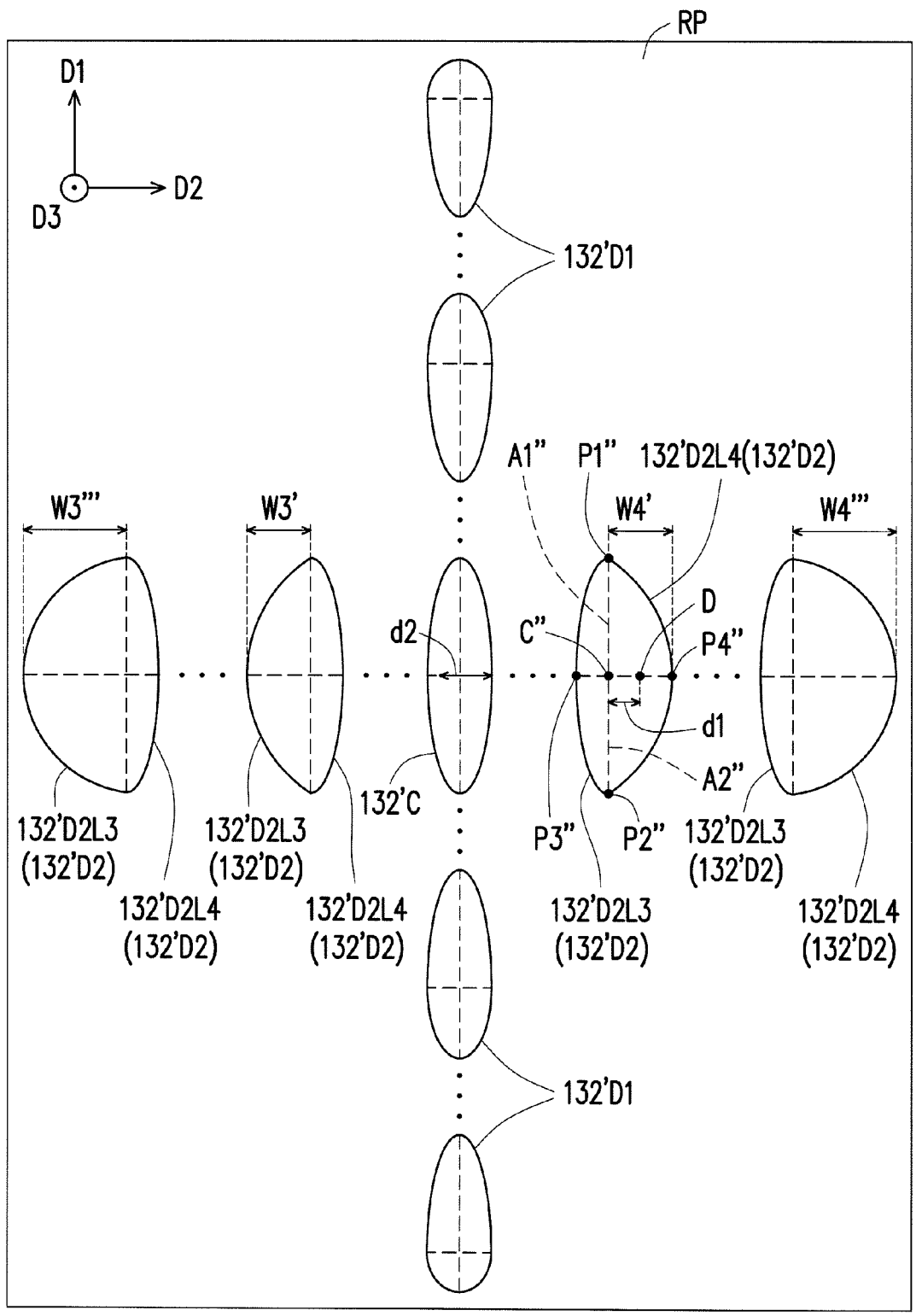
Figure 7C:
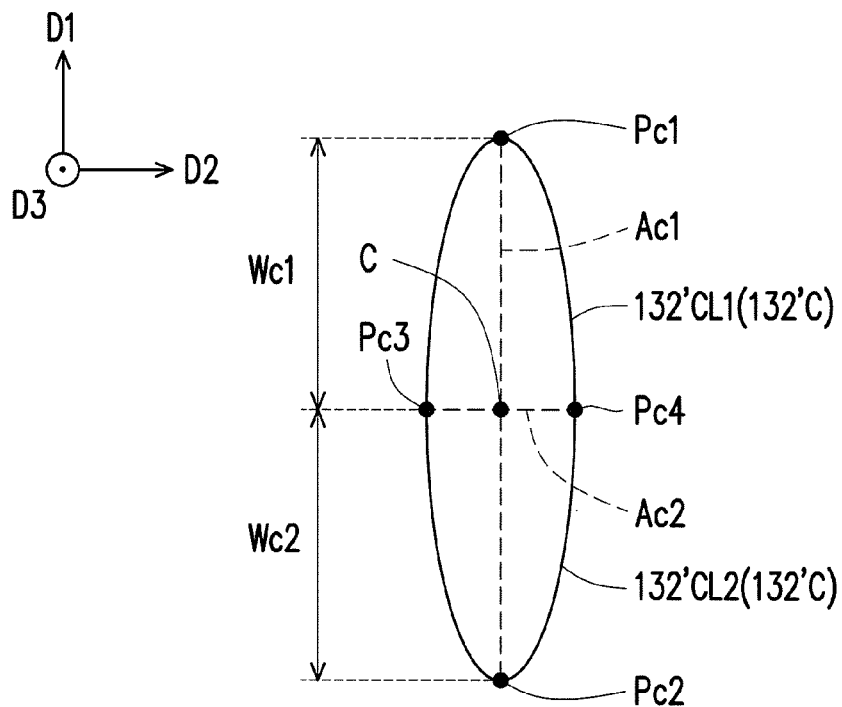
FIG. 7C and FIG. 7D respectively illustrate central orthographic projection patterns of FIG. 7A and FIG. 7B.
Figure 7D:
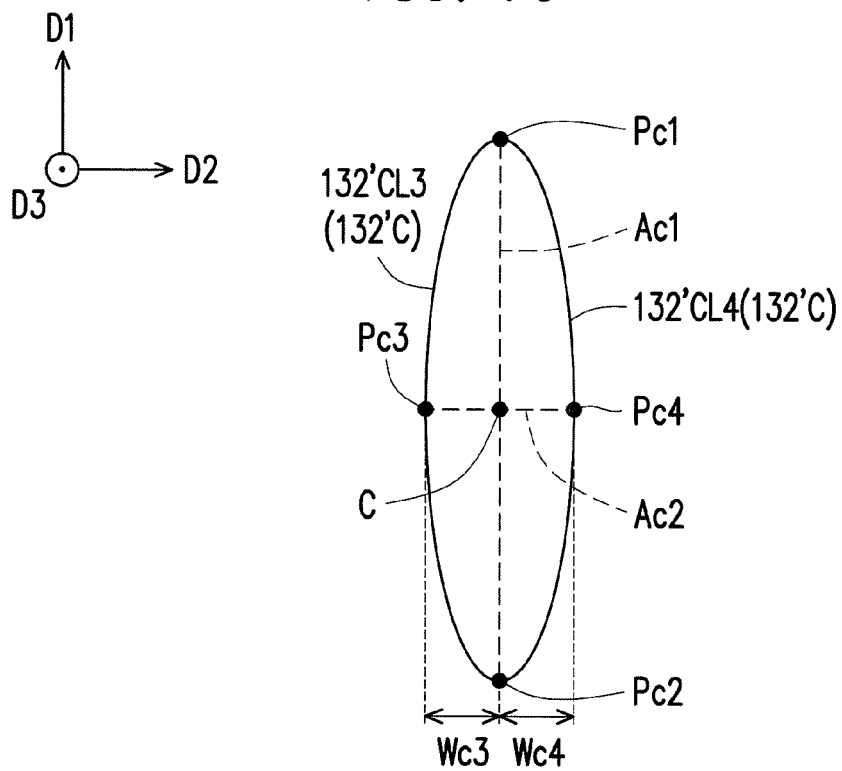

FIG. 7A and FIG. 7B are projection schematic diagrams of an optical microstructure orthographically projected to the reference plane according to an exemplary embodiment of the invention. FIG. 7C and FIG. 7D respectively illustrate central orthographic projection patterns of FIG. 7A and FIG. 7B. It should be noted that FIG. 7A and FIG. 7B illustrate a same exemplary embodiment, and for clarity's sake, two figures of FIG. 7A and FIG. 7B are adopted for description, and FIG. 7C and FIG. 7D respectively illustrate central orthographic projection patterns of FIG. 7A and FIG. 7B, and for clarity's sake, two figures of FIG. 7C and FIG. 7D are adopted for description.

Referring to FIG. 1, FIG. 7A, FIG. 7B and FIG. 7C, in the exemplary embodiment, the orthographic projection pattern projected on the reference plane RP by the optical microstructure 132 located at or near the center of the first surface S1 of the protective layer 130 is a central orthographic projection pattern 132'C. The central orthographic projection pattern 132'C is symmetric to a first axis Ac1 of the central orthographic projection pattern 132'C and symmetric to a second axis Ac2 of the central orthographic projection pattern 132'C.

Referring to FIG. 7C, the first axis Ac1 of the central orthographic projection pattern 132'C passes through two end points Pc1 and Pc2 of the central orthographic projection pattern 132'C having the maximum distance in the first direction D1, and the second axis Ac2 of the central orthographic projection pattern 132'C passes through two end points Pc3 and Pc4 of the central orthographic projection pattern 132'C having the maximum distance in the second direction D2. The central orthographic projection pattern 132'C includes two projection lines 132'CL1 and 132'CL2, where the projection line 132'CL1 and the projection line 132'CL2 are intersected at the two end points Pc3 and Pc4. The projection line 132'CL1 and the projection line 132'CL2 are respectively located at two opposite sides of the second axis Ac2 of the central orthographic projection pattern 132'C, i.e. an upper side and a lower side of the first axis Ac1 in FIG. 7C. The first axis Ac1 and the second axis Ac2 of the central orthographic projection pattern 132'C are intersected at a center point C of the central orthographic projection pattern 132'C, where in the first direction D1, a maximum width from the end point PC1 to the center point C is Wc1, and a maximum width from the end point PC2 to the center point C is Wc2. Referring to FIG. 7D, the central orthographic projection pattern 132'C includes two projection lines 132'CL3 and 132'CL4, where the projection line 132'CL3 and the projection line 132'CL4 are intersected at the two end points Pc1 and Pc2. The projection line 132'CL3 and the projection line 132'CL4 are respectively located at two opposite sides of the first axis Ac1 of the central orthographic projection pattern 132'C, i.e. a left side and a right side of the second axis Ac2 in FIG. 7D. In the second direction D2, a maximum width from the end point PC3 to the center point C is Wc3, and a maximum width from the end point PC4 to the center point C is Wc4. According to FIG. 7C and FIG. 7D, it is known that the central orthographic projection pattern 132'C can be regarded to be composed of two projection lines located different sides of the first axis Ac1 or two projection lines located at different sides of the second axis Ac2.

Referring to FIG. 7A first, taking the central orthographic projection pattern 132'C as a central reference pattern, a part of the orthographic projection patterns in the first direction D1 is a plurality of first direction orthographic projection patterns 132'D1. Each of the first direction orthographic projection patterns 132'D1 includes a first projection line 132'D1L1 and a second projection line 132'D1L2. The first projection line 132'D1L1 and the second projection line 132'D1L2 of each first direction orthographic projection pattern 132'D1 are intersected at two end points P3' and P4' of the corresponding first direction orthographic projection pattern 132'D1 having the maximum distance in the second direction D2, wherein the first projection line 132'D1L1 and the second projection line 132'D1L2 of each first direction orthographic projection pattern 132'D1 are respectively located at two opposite sides of the corresponding second axis A2'. To be specific, the first projection line 132'D1L1 and the second projection line 132'D1L2 of each of the first direction orthographic projection patterns 132'D1 in FIG. 7A are respectively located at the upper side and the lower side of the corresponding second axis A2'. It should be noted that only four first direction orthographic projection patterns 132'D1 are schematically illustrated in FIG. 7A and FIG. 7B, though the invention is not limited thereto.

According to the above description, taking the central orthographic projection pattern 132'C as the central reference pattern, in the first direction D1, the first projection line 132'D1L1 of each of the first direction orthographic projection patterns 132'D1 located at one of the two opposite sides of the central reference pattern (for example, the upper side) and the corresponding second axis A2' have the maximum widths W1', W1'' therebetween (for example, the maximum widths corresponding to the two first direction orthographic projection patterns 132'D1 located at the upper side of FIG. 7A), wherein the maximum widths W1' and W1'' corresponding to the first direction orthographic projection patterns 132'D1 located at the upper side of the central reference pattern are gradually changed along the first direction D1. To be specific, the maximum widths W1' and W1'' are gradually decreased along the first direction D1 and towards a direction away from the central reference pattern (i.e. the central orthographic projection pattern 132'C).

According to FIG. 7A and FIG. 7C, it is known that the maximum width Wc1 from the end point Pc1 of the central orthographic projection pattern 132'C (the central reference pattern) to the center point C, and the aforementioned maximum widths W1' and W1'' are gradually changed along the first direction D1 and towards the direction away from the central reference pattern, and are, for example, gradually decreased, i.e. Wc1>W1'>W1''.

Referring to FIG. 7A again, taking the central orthographic projection pattern 132'C as the central reference pattern, in the first direction D1, the second projection line 132'D1L2 of each first direction orthographic projection pattern 132'D1 located at the other one of the two opposite sides of the central reference pattern (for example, the lower side) and the corresponding second axis A2' has the maximum width W2', W2'' therebetween (for example, the maximum widths corresponding to the two first direction orthographic projection patterns 132'D1 located at the lower side of FIG. 7A), wherein the maximum widths W2' and W2'' corresponding to the first direction orthographic projection patterns 132'D1 located at the lower side of the central reference pattern are gradually changed along the first direction D1. To be specific, the maximum widths W2' and W2'' are gradually decreased along the first direction D1 and towards a direction away from the central reference pattern (i.e. the central orthographic projection pattern 132'C).

According to FIG. 7A and FIG. 7C, it is known that the maximum width Wc2 from the end point Pc2 of central orthographic projection pattern 132'C (the central reference pattern) to the center point C, and the aforementioned maximum widths W2' and W2'' are gradually changed along the first direction D1 and towards the direction away from the central reference pattern, and are, for example, gradually decreased, i.e. Wc2>W2'>W2''.

Then, referring to FIG. 7B and FIG. 7D, in the exemplary embodiment, a part of the orthographic projection patterns in the second direction D2 is a plurality of second direction orthographic projection patterns 132'D2. Each of the second direction orthographic projection patterns 132'D2 includes a third projection line 132'D2L3 and a fourth projection line 132'D2L4. The third projection line 132'D2L3 and the fourth projection line 132'D2L4 of each second direction orthographic projection pattern 132'D2 are intersected at two end points P1'' and P2'' of the corresponding second direction orthographic projection pattern 132'D2 having the maximum distance in the first direction D1. The third projection line 132'D2L3 and the fourth projection line 132'D2L4 of each second direction orthographic projection pattern 132'D2 are respectively located at two opposite sides of the corresponding first axis A1'. To be specific, the third projection line 132'D2L3 and the fourth projection line 132'D2L4 of each second direction orthographic projection pattern 132'D2 in FIG. 7B are respectively located at the left side and the right side of the corresponding first axis A1". It should be noted that only four second direction orthographic projection patterns 132'D2 are schematically illustrated in FIG. 7A and FIG. 7B, though the invention is not limited thereto.

According to the above description, taking the central orthographic projection pattern 132'C as the central reference pattern, in the second direction D2, the third projection line 132'D2L3 of each second direction orthographic projection pattern 132'D2 located at one of the two opposite sides of the central reference pattern (for example, the left side) and the corresponding first axis A1" has the maximum width W3', W3" therebetween (for example, the maximum widths corresponding to the two second direction orthographic projection patterns 132'D2 located at the left side of FIG. 7B), where the maximum widths W3' and W3" corresponding to the second direction orthographic projection patterns 132'D2 located at the left side of the central reference pattern are gradually increased along the second direction D2 and towards a direction away from the central reference pattern (i.e. the central orthographic projection pattern 132'C).

According to FIG. 7B and FIG. 7D, it is known that the maximum width Wc3 from the end point Pc3 of the central orthographic projection pattern 132'C (the central reference pattern) to the center point C, and the aforementioned maximum widths W3' and W3" are gradually changed along the second direction D2 and towards the direction away from the central reference pattern, and are, for example, gradually increased, i.e. Wc3<W3'<W3".

Referring to FIG. 7B again, taking the central orthographic projection pattern 132'C as the central reference pattern, in the second direction D2, the fourth projection line 132'D2L4 of each second direction orthographic projection pattern 132'D2 located at the other one of the two opposite sides of the central reference pattern (for example, the right side) and the corresponding first axis A1' has the maximum width W4', W4" therebetween (for example, the maximum widths corresponding to the two second direction orthographic projection patterns 132'D2 located at the right side of FIG. 7B), where the maximum widths W4' and W4" corresponding to the second direction orthographic projection patterns 132'D2 located at the right side of the central reference pattern are gradually changed along the second direction D2. To be specific, the maximum widths W4' and W4" are gradually increased along the second direction D2 and towards a direction away from the central reference pattern (i.e. the central orthographic projection pattern 132'C).

According to FIG. 7B and FIG. 7D, it is known that the maximum width Wc4 from the end point Pc4 of the central orthographic projection pattern 132'C (the central reference pattern) to the center point C, and the aforementioned maximum widths W4' and W4" are gradually changed along the first direction D1 and towards the direction away from the central reference pattern, and are, for example, gradually increased, i.e. Wc4<W4'<W4".

Parameters of the gradual change and a degree of the gradual change of the second direction orthographic projection patterns 132'D2 of the exemplary embodiment are described in detail below. In the exemplary embodiment, referring to FIG. 1 and FIG. 7B, regarding a point of the optical microstructure 132 corresponding to the second direction orthographic projection pattern 132'D2 that has the maximum distance with the first surface S1 of the protective layer 130 in the third direction D3, a projection point of the above point on the reference plane RP is defined as D. A distance between the projection point D and the first axis A1" of the second direction orthographic projection patterns 132'D2 is defined as d1, and a width of the second axis A2" of the central orthographic projection pattern 132'C' is defined as d2. Each of the second direction orthographic projection patterns 132'D2 has a shift ratio (d1/d2*100%). Taking the central orthographic projection pattern 132'C as the central reference pattern, in the second direction D2, the shift ratios (d1/d2*100%) of the second direction orthographic projection patterns 132'D2 located at one of the two opposite sides (for example, the right side) of the central reference pattern range between 0-40%, i.e. the shift ratio corresponding to the central reference pattern is 0, and the farther the second direction orthographic projection pattern 132'D2 is away from the central reference pattern, the greater the shift ratio thereof is. Conversely, taking the central orthographic projection pattern 132'C as the central reference pattern, in the second direction D2, the shift ratios (d1/d2*100%) of the second direction orthographic projection patterns 132'D2 located at the other one of the two opposite sides (for example, the left side) of the central reference pattern range between 0-40%, and the farther the second direction orthographic projection pattern 132'D2 is away from the central reference pattern, the greater the shift ratio thereof is.

According to the above description, in the embodiment, referring to FIG. 1, FIG. 7A and FIG. 7B, as the first direction orthographic projection patterns 132'D1 and the second direction orthographic projection patterns 132'D2 located on different positions are configured in a gradual change manner, shapes of the optical microstructures 132 corresponding to the first direction orthographic projection patterns 132'D1 and the second direction orthographic projection patterns 132'D2 are also configured in the gradual change manner, such that the scattering angles of the image beam B formed on different positions of the first surface S1 in the first direction D1 (the vertical direction) and the scattering angle thereof in the second direction D2 (the horizontal direction can be adjusted. In other words, in the exemplary embodiment, regarding different positions on the first surface S1, fine tuning of the scattering angles in different direction can be implemented, such that the imaging quality of the images displayed on the projection screen 100 can be further improved.

In the aforementioned exemplary embodiments, the projection screen 100 can be further integrated into a touch control device (not shown). The touch control device can be disposed on a surface of the absorbing layer 140 facing the back side 104 of the projection screen 100, such that a user may perform an intuitive touch input on the protective layer 130 of the projection screen 100. The touch control device can also be disposed on an upper edge of the projection screen 100 adjacent to the first surface S1 of the protective layer 130, and an invisible light curtain parallel to the first surface S1 can be generated to facilitate the user to perform an intuitive touch input on the protective layer 130 of the projection screen 100. Since enough instructions and recommendations for operation and implementation of the touch control device can be learned from general knowledge of the field, details thereof are not repeated.

Since the user may perform intuitive touch input on the protective layer 130 of the projection screen 100, and the protective layer 130 has a plurality of optical microstructures 132 closely and randomly disposed on the first surface S1 of the protective layer 130, and compared to the arranging directivity of the Fresnel structures 120, arranging of the optical microstructures 132 has less directivity, when the user performs a touch input operation on the projection screen 100 (integrated with the touch control device) of the invention, a stylus or a finger used by the user may smoothly move towards all directions.

In summary, in the projection screen of the exemplary embodiments of the invention, by configuring the Fresnel structures between the substrate and the protective layer, the protective layer may effectively protect the Fresnel structures, such that the projection screen of the exemplary embodiments of the invention may have good reliability. Moreover, the protective layer is closely and randomly configured with a plurality of optical microstructures, and the optical microstructures may scatter the image beam transmitted to the projection screen, so as to effectively avoid the hot spot phenomenon and improve the imaging quality of the image beam projected on the projection screen. Moreover, based on the design of the optical structures, the projection screen may have a better anti-glare function. In addition, the first axis of each of the orthographic projection patterns of the optical microstructures on the reference plane passes through two end points having the maximum distance in the first direction, and the second axis of the orthographic projection pattern passes through two end points having the maximum distance in the second direction, and the orthographic projection patterns are symmetric relative to at least one of the first axis and the second axis. Based on the aforementioned projection relationship, the axial length of the orthographic projection pattern along the first axis corresponds to the distance between two end points on the optical microstructure having the maximum distance in the first direction, and the axial length of the orthographic projection pattern along the second axis corresponds to the distance between two end points on the optical microstructure having the maximum distance in the second direction. In the projection screen of the exemplary embodiments of the invention, by designing the axial lengths along the first axis and the second axis of the orthographic projection pattern or by designing the symmetric shape or asymmetric shape of the orthographic projection pattern relative to the first axis and/or the second axis, the scattering angle in different directions (the vertical direction or the horizontal direction) can be adjusted.

Further, when the axial length along the first axis is greater than the axial length along the second axis, compared to the scattering angle in the horizontal direction, the scattering angle in the vertical direction may converge the image beam in the vertical direction, and result in a larger scattering angle of the image beam in the horizontal direction, such that the projection screen of the exemplary embodiments of the invention is adapted to an ultra-short throw projection system. On the other hand, in the projection screen of the exemplary embodiments of the invention, by designing a gradual change situation of the orthographic projection patterns located at different positions (the first direction orthographic projection patterns and the second direction orthographic projection patterns), fine-tuning of the scattering angles of different directions can be implemented at different positions, so as to further improve the imaging quality of the projection screen. Moreover, compared to the arranging directivity of the Fresnel structures, arranging of the optical microstructures has less directivity. When the user performs a touch input operation on the projection screen (integrated with the touch control device) of the invention, a stylus or a finger used by the user may smoothly move towards all directions.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first surface", "second surface", etc. mentioned in the specification and the claims are merely used to name the elements and should not be regarded as limiting the upper or lower bound of the number of the components/devices.

What is claimed is:

1. A projection screen, having an image-source side, the projection screen comprising:
    a substrate;
    a plurality of Fresnel structures, located on a surface of the substrate facing the image-source side and arranged along a first direction, wherein each of the Fresnel structures extends along a second direction; and
    a protective layer, the Fresnel structures located between the substrate and the protective layer, and the protective layer having a first surface facing the image-source side, wherein the first surface has a plurality of optical microstructures,
    wherein the optical microstructures are orthographically projected on a reference plane to correspondingly form a plurality of orthographic projection patterns on the reference plane, and each of the orthographic projection patterns has a first axis and a second axis substantially perpendicular to each other,
    wherein the first axis of each of the orthographic projection patterns passes through two end points having a maximum distance in the first direction, the second axis of each of the orthographic projection patterns passes through two end points having a maximum distance in the second direction, and each of the orthographic projection patterns is symmetric relative to at least one of the first axis and the second axis,
    wherein the optical microstructures are randomly distributed on the first surface of the protective layer, and a ratio between a sum of surface areas of the optical microstructures orthographically projected on the first surface and a total surface area of the first surface falls within a range between 80% and 100%.

2. The projection screen as claimed in claim 1, wherein each of the orthographic projection patterns is symmetric to the first axis and symmetric to the second axis on the reference plane.

3. The projection screen as claimed in claim 1, wherein each of the orthographic projection patterns is symmetric to the first axis and not symmetric to the second axis on the reference plane.

4. The projection screen as claimed in claim 1, wherein the orthographic projection pattern orthographically projected on the reference plane by the optical microstructure located at a position near a center of the first surface is a central orthographic projection pattern, wherein the central orthographic projection pattern is symmetric relative to the first axis of the central orthographic projection pattern, a part of the orthographic projection patterns in the first direction is a plurality of first direction orthographic projection patterns, wherein each of the first direction orthographic projection patterns comprises a first projection line and a second projection line, the first projection line and the second projection line of each of the first direction orthographic projection patterns are intersected at two end points having a maximum distance in the second direction, and the first projection line and the second projection line are respectively located at two opposite sides of corresponding the second axis.

5. The projection screen as claimed in claim 1, wherein the substrate is a transparent substrate.

6. The projection screen as claimed in claim 1, wherein the orthographic projection pattern orthographically projected on the reference plane by the optical microstructure located at a position near a center of the first surface is a central orthographic projection pattern, wherein the central orthographic projection pattern is symmetric relative to the first axis of the central orthographic projection pattern, a part of the orthographic projection patterns in the second direction is a plurality of second direction orthographic projection patterns, wherein each of the second direction orthographic projection patterns comprises a third projection line and a fourth projection line, the third projection line and the fourth projection line of each of the second direction orthographic projection patterns are intersected at two end points having a maximum distance in the first direction, and the third projection line and the fourth projection line are respectively located at two opposite sides of the first axis of the second direction orthographic projection pattern.

7. The projection screen as claimed in claim 1, wherein the optical microstructures protrude out from the first surface of the protective layer.

8. The projection screen as claimed in claim 1, wherein the optical microstructures are recessed into the first surface of the protective layer.

9. The projection screen as claimed in claim 1, wherein a part of the optical microstructures protrude out from the first surface of the protective layer, and the other part of the optical microstructures are recessed into the first surface of the protective layer.

10. The projection screen as claimed in claim 1, wherein the protective layer and the Fresnel structures are configured in conformal.

11. The projection screen as claimed in claim 1, wherein the reference plane is substantially parallel to the surface of the substrate facing the image-source side.

12. The projection screen as claimed in claim 5, further comprising a light-absorbing layer, wherein the substrate has a second surface and a third surface opposite to each other, the surface of the substrate facing the image-source side is the second surface, and the light-absorbing layer is located on the third surface of the substrate.

13. The projection screen as claimed in claim 1, wherein each of the Fresnel structures is a transparent structure, and each of the Fresnel structures has a reflective scattering surface and a transmissive surface, and the reflective scattering surface is connected to the transmissive surface.

14. The projection screen as claimed in claim 1, wherein each of the Fresnel structures is a non-transparent structure, and each of the Fresnel structures has a reflective scattering surface and a transmissive surface, and the reflective scattering surface is connected to the transmissive surface, and the transmissive surface is a light-absorbing surface.

15. The projection screen as claimed in claim 2, wherein a shape of each of the orthographic projection patterns on the reference plane is substantially an oval, a rhombus or a hairline.

16. The projection screen as claimed in claim 3, wherein each of the orthographic projection patterns comprises a first projection line and a second projection line, and the first projection line and the second projection line of each of the orthographic projection patterns are intersected at the two end points having the maximum distance in the second direction, and the first projection line and the second projection line are located at two opposite sides of the second axis, wherein the first projection line and the second projection line are selected from a part of an oval circumference of one or a plurality of ovals or a part of a side of one or a plurality of rhombuses.

17. The projection screen as claimed in claim 4, wherein the central orthographic projection pattern is taken as a central reference pattern, and in the first direction, the first projection line and the second projection line of each of the first direction orthographic projection patterns located at two opposite sides of the central orthographic projection patterns respectively have a maximum width with corresponding the second axis, wherein the maximum widths corresponding to the first direction orthographic projection patterns are gradually changed along the first direction and towards a direction away from the central reference pattern.

18. The projection screen as claimed in claim 6, wherein the central orthographic projection pattern is taken as the central reference pattern, and in the second direction, the third projection line and the fourth projection line of each of the second direction orthographic projection patterns located at two opposite sides of the central reference pattern respectively have a maximum width with the first axis of the second direction orthographic projection pattern, wherein the maximum widths corresponding to the second direction orthographic projection patterns are gradually changed along the first direction and towards a direction away from the central reference pattern.

19. The projection screen as claimed in claim 13, wherein an image source is set at the image-source side, and an image beam is provided by the image source and is transmitted to the projection screen, wherein the image beam is sequentially transmitted to the optical microstructures on the first surface, and after the image beam penetrates through the protective layer, a scattering angle of the image beam in the first direction and a scattering angle of the image beam in the second direction are respectively changed by the optical microstructures, and the changed image beam is transmitted to the reflective scattering surfaces of each of the Fresnel structures and is scattered and reflected by the reflective scattering surfaces to again penetrate through the protective layer for emitting out of the projection screen.

* * * * *